Patented Oct. 19, 1954

2,692,258

UNITED STATES PATENT OFFICE 2,692,258

OLEFIN POLYMERIZATION WITH MOLYBDENA-GROUP 4a CATALYSTS

Alan K. Roebuck, Dyer, Ind., and Alex Zletz, Park Forest, Ill., assignors to Standard Oil Company, Chicago, Ill., a corporation of Indiana No Drawing. Application April 28, 1951,
Serial No. 223,643

22 Claims. (Cl. 260—88.1)

This invention relates to a novel polymerization process and to novel polymerization products produced thereby. In a more specific aspect, this invention relates to a novel process for the polymerization of ethylene.

One object of our invention is to provide novel and highly useful catalysts for the preparation of high molecular weight polymers from ethylene-containing gas mixtures. Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials. An additional object is to provide a method for the manufacture of novel and unusual homopolymers from ethylene having specific viscosities ($\times 10^5$) in excess of about 100,000 or even in excess of 300,000, said homopolymers being characterized by their minimal solubility in boiling aromatic solvents. Still another object is to provide new ethylene homopolymers having extremely high molecular weights and related physical and mechanical properties heretofore unattained in the art.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials, particularly with a normally gaseous mono-olefin such as propylene. Yet another object is to provide novel methods for the regeneration of solid catalysts employed for the conversion of ethylene-containing gas streams to high molecular weight solid materials. These and other objects of our invention will become apparent from the ensuing description thereof.

Briefly, the inventive process comprises the conversion of ethylene to high molecular weight normally solid polymers by contact with a catalyst comprising essentially a reduced molybdenum oxide combined with titania or zirconia. The inventive process is effected at temperatures between about 75° C. and about 325° C., preferably between about 130° C. and 260° C., and pressures between about atmospheric and 5000 p. s. i. g. or higher, preferably between about 200 to 2000 or about 1000 p. s. i. g. The normally solid materials produced by the catalytic conversion tend to accumulate upon and within the solid catalyst. The rate of ethylene conversion and the extent of removal of solid polymeric conversion products from the catalyst can both be favorably influenced by maintaining the catalyst, during ethylene conversion, in contact with a liquid medium which serves both as a reaction medium and a solvent for the solid reaction products. Suitable liquid reaction media include various hydrocarbons, particularly an aromatic hydrocarbon such as benzene, toluene or xylenes. However, the conversion of ethylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to ethylene homopolymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 200 to 700, wax-like ethylene homopolymers having an approximate specific viscosity ($\times 10^5$) between about 1000 and 10,000, and tough resinous ethylene homopolymers having an approximate specific viscosity ($\times 10^5$) of 10,000 to more than 100,000. In addition, the process of the present invention can be employed to effect the copolymerization of ethylene with other polymerizable materials and particularly with propylene.

An important feature of our process is the employment of a solid catalyst comprising essentially a molybdenum-oxygen compound in which molybdenum is present in some measure in sub-hexavalent state, the preferred example being reduced molybdenum oxide ($MoO_3$) and an oxide of a metal in group 4a of the periodic table selected from the class consisting of titania and zirconia. The relative proportions of group 4a metal oxide to supported molybdena may be varied throughout a relatively wide range provided that each component is present in amounts of at least approximately 1%. Molybdena alone, whether in reduced or unreduced state, is ineffective and likewise the group 4a metal oxide by itself is ineffective. The preferred molybdena-group 4a metal oxide weight ratios are in the range of about 1:20 to 1:1, or approximately 1:4. A large number of other common catalyst supports have been tested with various amounts of molybdena and found to be ineffective. We usually employ a conditioned molybdena catalyst composed of titania or zirconia base containing about 1 to 80%, preferably about 4 to 50%, or approximately 20%, of molybdena (or other compound of molybdenum and oxygen) supported thereon.

The group 4a metal oxide base may be prepared in known manner and the molybdenum component of the catalyst may likewise be incorporated in or deposited on the base in known manner. By way of illustration, titanium or zirconium hydroxides can be prepared from corresponding salts such as tetranitrates or tetrachlorides by reaction with ammonium hydroxide, the resultant hydroxide precipitates can be washed and mixed with water to form a thick slurry; ammonium paramolybdate is then added to the slurry and the mixture is dried, e. g. at 150° C., and finally calcined, say at 650° C. for 2 hours to produce a catalyst mass which is suitable for conditioning by treatment with a reducing gas, as will be described hereinafter. If desired the zirconium or titanium hydroxides can be thermally dehydrated prior to impregnation with a molybdenum salt.

In another method of catalyst preparation a group 4a metal oxide gel is prepared and impregnated with a molybdenum salt. Thus zirconia and titania gel can be prepared by hydrolysis of ortho-ethyl zirconates or titanates or by slow hydrolysis of $ZrCl_4$ or $TiCl_4$ in the presence of ethylene oxide. Other methods of gel preparation include the controlled hydrolysis of salts such as zirconyl chloride (U. S. Patents 2,442,772 and 2,467,089).

It should be understood that mixtures of group 4a metal oxides may be employed in the preparation of suitable catalysts and that gamma-alumina may be incorporated in catalysts suitable for purposes of the present invention.

The molybdena or other molybdenum-oxygen compound, such as cobalt molybdate, nickel molybdate or iron molybdate may be incorporated in the catalyst base in any known manner, e. g. by impregnation, co-precipitation, co-gelling, and/or absorption, and the catalyst base and/or finished catalyst may be heat stabilized in the manners analogous to those heretofore employed in the preparation of hydroforming or hydrofining catalysts.

Oxides of other metals such as magnesium, zinc, chromium, vanadium, etc., may be present in minor amounts, below 10 weight per cent and preferably below 1 weight per cent of the total catalyst. The catalyst, however, should be substantially free from oxides of alkali metals.

The catalyst must be conditioned or activated before it is useful for effecting ethylene polymerization and the conditioning step is of great importance. It appears that at least a part of the molybdenum must be present in the final catalyst in a sub-hexavalent condition. Since molybdenum is usually composited with the group 4a metal oxide in the form of a hexavalent molybdenum compound, such as $MoO_3$ which can be produced by decomposition of ammonium paramolybdate, it is necessary to subject the catalyst to a conditioning or reducing step before it is effective for catalyzing ethylene polymerization. The conditioning or reducing step is preferably effected with hydrogen although other reducing gases such as carbon monoxide, mixtures of hydrogen and carbon monoxide (water gas, synthesis gas, etc., sulfur dioxide, etc., may be employed. The temperature of the conditioning step should be upwards of about 300 to 350° C., but usually not higher than about 650° C., the best conditioning temperature usually being in the range of about 400 to 500° C., e. g. about 450° C. The hydrogen partial pressure in the conditioning step may range from ordinary pressure to 3000 p. s. i. g. or more, but for practical purposes is usually in the range of about 50 to 500, e. g. about 200 p. s. i. g. The length of time of the conditioning step can be varied widely and may range from a few seconds, e. g., 10 seconds up to about 15 hours, although periods in excess of about 1 or 2 hours are not usually required.

The conditioning treatment hereinabove described is required not only for fresh catalyst, but is suitable also for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by burning combustible deposits therefrom with oxygen followed by the conditioning step. The conditioning treatment necessary to effect reactivation of catalysts from which polymer product has been removed can be effected at somewhat lower temperatures than would be effective in the initial conditioning of fresh catalyst preparations.

The catalyst can be employed for example, as pellets of generally cylindrical, spherical, or other shapes, or even in the form of coarse lumps. The pellets may range in size from about 2 to about 6 mesh per inch. A suitable form of pellet is of generally cylindrical shape, ⅜ inch long and ⅜ inch diameter. Powdered catalysts appear to be extremely active for polymerization, inducing ethylene polymerization at a higher rate to produce generally higher molecular weight polymers than relatively coarse catalysts. However, the small catalyst particles appear to become rapidly coated with solid, high molecular weight polymer and it is necessary to effect efficient removal of said polymer, e. g., by employing high solvent:catalyst ratios such as 5–50 pounds of solvent per pound of catalyst in the reactor.

The charging stock to the present polymerization process preferably comprises essentially ethylene. The ethylene charging stocks may contain inert hydrocarbons, as in refinery gas streams, for example, methane, ethane, propane, etc. When the charging stock contains propylene as well as ethylene, both these olefins contribute to the production of resinous high molecular weight products. The charging stock may contain other components such as sulfur dioxide, carbon monoxide, etc., and it may contain other polymerizable materials such as butylene, acetylene, isoprene, etc.

It has been found that the inclusion of oxygen with the feed stock effects temporary poisoning of the catalyst, possibly through the mechanism of oxidizing molybdenum in the catalyst to the hexavalent state, but the catalyst can be reactivated by reduction. It is, therefore, desirable to minimize or avoid the introduction of oxygen into contact with the catalyst. Water, likewise, effects poisoning of the catalysts. It is, therefore, very desirable that the introduction of water or materials which produce water in contact with the catalyst in the present process be avoided. Volatile oxygenated compounds such as ethanol, ethyl ether, acetaldehyde, acetone and acetal, which are often present in ethylene charging stocks prepared by high temperature catalytic dehydration of ethanol should, likewise, be removed from the polymerization feed stock, e. g. by adsorption on activated alumina, activated carbon, silica gel or the like, or by other methods known in the art.

In general, polymerization can be effected in the present process at temperatures between about 75° C. and about 325° C. Increasing the polymerization temperature tends to reduce the average molecular weight of the polymer produced by the process. It is often desirable to select a polymerization temperature which is at least equal to the melting or softening point of the solid polymerization product. Usually polymerization is effected in the present process at temperatures between about 110° C. and about 275° C. or the preferred narrower range of 130°–260° C. The conjoint use of polymerization temperatures between about 200° C. and about 250° C. and a liquid aromatic hydrocarbon reaction medium such as benzene or xylene is highly desirable in producing ethylene polymers having specific viscosities ($\times 10^5$) ranging on the average from about 10,000 to about 30,000 in continuous operations with relatively long on-stream periods and clean catalysts.

The present process can be employed for the production of relatively high molecular weight ethylene hetero- and homo-polymers at relatively low pressures. For example, at a polymerization pressure of only about 1000 p. s. i. g., ethylene has been converted in substantial measure, according to the present process, to a homopolymer having a specific viscosity ($\times 10^5$) of about 100,000. These results are astounding when it is borne in mind that in prior art processes for the thermal polymerization of ethylene (as described in U. S. Patent 2,153,553) or polymerization of ethylene in the presence of oxygen as the catalyst (U. S. Patent 2,188,465), pressures in excess of 30,000 p. s. i. g. lead to the production of ethylene polymers having relatively low molecular weight, such as 24,000, as determined by the Staudinger specific viscosity method. The process of the present invention can be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about .1 and about 10 volumes, preferably about .5 to 5 or about 2 volumes of ethylene solution in a liquid reaction medium, which is usually an aromatic hydrocarbon such as benzene or xylenes. The amount of ethylene in such solutions should be in the range of about 1 to 30% by weight, preferably about 2 to 10 weight per cent or, for example, about 4 to 5 weight per cent. In batch operations, operating periods of between about one-half and about 10 hours, usually between about 1 and about 4 hours, are employed and the reaction autoclave is charged with ethylene as the pressure falls as a result of the ethylene conversion reaction.

Ethylene may be polymerized in the gas phase and in the absence of a liquid reaction medium by contact with the molybdenum catalysts employed in the present process. Upon completion of the desired polymerization reaction it is then possible to treat the catalyst for the recovery of the solid polymerization products, for example by extraction with suitable solvents. However, in the interests of obtaining increased rates of ethylene conversion and of continuously removing solid conversion products from the catalyst, it is desirable to effect the conversion of ethylene in the presence of suitable liquid reaction media. The liquid reaction medium may also be employed as a means of contacting the ethylene with catalyst by employing the technique of preparing a solution of ethylene in the liquid reaction medium and contacting the resultant solution with the polymerization catalyst. Usually it is preferred to employ inert liquid organic materials such as hydrocarbons, particularly aromatics such as benzene, toluene, xylenes, and alkylated aromatics as reaction media in the present process.

The liquid reaction medium employed in the present process appears to perform a variety of functions, and to perform these functions in varying degrees depending upon the operating conditions, catalyst and identity of the medium. Thus, the liquid reaction medium appears to function as a solvent for the ethylene to bring the ethylene into the necessary contact with the catalyst surface and/or growing ethylene polymer chain. The liquid reaction medium may function to protect the growing polymer chain from chain breakers, such as reaction-inhibiting impurities in the feed stock, polymer already formed upon certain parts of the catalyst surface, etc. The liquid reaction medium serves to reduce the viscosity of the solid polymer retained upon and within the catalyst and thus may facilitate the process of transferring ethylene where it is needed. The medium dissolves some of the normally solid product from the catalyst surface. The liquid reaction medium makes possible a solid-liquid interface in which the growing ethylene polymer chain may be oriented and from which it may react with ethylene supplied from solution in the medium and/or from the gas phase. It should be understood, however, that we are in nowise bound by the theoretical considerations herein advanced to explain possible modes of action of the liquid reaction medium.

The fact remains that the inclusion of the liquid medium in the polymerization reaction zone in contact with the catalyst produces an unpredictable and desirable change in the polymerization reaction conducive to the formation of high yields of normally solid hydrocarbon products. A particularly desirable effect of the liquid reaction medium is to increase substantially the rate of ethylene polymerization.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylene, mesitylene and xylene-p-cymene mixtures can be employed. Tetrahydronaphthalene can also be employed. In addition, we may employ such aromatic hydrocarbons as ethylbenzene, isopropylbenzene, n-propylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

The aromatic hydrocarbons may contain more or less saturated hydrocarbons, as commercially produced, but should be freed of sulfur compounds, polyolefins and aromatic olefins such as styrene before use in the present invention by acid treatment, e. g., with anhydrous p-toluenesulfonic acid, sulfuric acid, or by equivalent treatments, for example with maleic anhydride, sodium, etc., or by combinations of suitable treatments.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, n-decane, n-dodecane, cyclohexane, methylcyclohexane, dimethylcyclopentane, ethylcyclohexane and the like.

We may also employ a liquid hydrocarbon reaction medium comprising liquid olefins, e. g., n-hexene, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

In addition to, or as a less desirable substitute for, the liquid hydrocarbon reaction media of the type above described, we may employ inert chlorinated hydrocarbons such as chlorobenzene, paradichlorobenzene, and the like.

The liquid hydrocarbon reaction medium may be present in the polymerization reaction zone in proportions of about 10 to about 99 per cent by weight, based on the weight of both ethylene and reaction medium. The liquid hydrocarbon reaction medium is present in the reaction zone as a distinct liquid phase. At low ratios of ethylene to the hydrocarbon reaction medium, for example ratios between about 1 and about 30 per cent, temperature control during the course of the ethylene conversion process can be readily accomplished owing to the presence in the reaction zone of a large liquid mass having relatively high heat capacity. The liquid hydrocarbon reaction medium can, moreover, be cooled by indirect heat exchange inside or outside the reaction zone. The employment of low ethylene concentrations in the hydrocarbon reaction medium also results in a marked reduction in the rate of accumulation of solid polymers on the catalyst in continuous operations.

The present polymerization process is amenable to a considerable variety of processing techniques and expedients. Thus, ethylene may be contacted as a gas in the absence of a liquid hydrocarbon reaction medium with the catalyst, which may be employed in the form of fluidized particles or a fluidized fixed bed of particles, as a fixed bed, or as a countercurrent moving bed of particles; these techniques being well known in the art of vapor phase hydrocarbon conversion, particularly catalytic cracking, and not being part of the claimed invention, need not be detailed here.

Catalyst coated with solid polymers produced in such vapor phase processes can be treated to recover solid polymerization products and to cleanse the catalyst, employing as solvents liquid hydrocarbons which may be the same as the liquid hydrocarbon reaction media above described, certain chemically inert chlorinated hydrocarbon solvents or other solvents. The catalyst thus cleansed can be returned to the process, preferably after being subjected to an activation treatment with a reducing gas, such as hydrogen. If desired, the extracted catalyst can be subjected to alternate oxidation and reduction treatments to reactivate it.

A fixed bed reactor with either downflow or upflow of ethylene and liquid hydrocarbon reaction medium can be employed. Parallel fixed bed reactors can be employed to obtain continuous operation, as in fixed bed hydrocarbon catalytic cracking units, one bed being freed from polymer and/or reconditioned while the other bed is on stream by suitable manual or automatic time-cycle valve operations to control the flows of ethylene, liquid hydrocarbon reaction medium, solvent and conditioning or regeneration gases to each bed of catalyst.

A moving bed or slurry operation can be employed, in which a slurry of catalyst in the liquid hydrocarbon reaction medium is allowed to flow downwardly through a tower or through one or more tubes. Ethylene or a solution of ethylene in liquid hydrocarbon reaction medium is injected into the lower portion of the tower or tubes and, optionally, at various elevations within the tower or tubes. A slurry of catalyst and solid polymerization products is withdrawn as one stream from the reactor and unconverted ethylene and/or diluent gases and/or relatively low boiling polymerization products are withdrawn from the reactor as a second stream. In the moving bed operation, the solid ethylene polymers are separated from the catalyst in a zone external to the reaction zone. Thus, the catalyst can be extracted with the liquid hydrocarbon reaction medium or with a specially selected wax solvent in suitable equipment and the catalyst can then be recycled to the reactor. If catalyst activity has deteriorated seriously, the polymer-freed catalyst can be subjected to a regeneration treatment prior to its recycle to the reaction zone.

As will be apparent, other types of reactor may also be employed. Thus, the polymerization can be carried out batchwise in autoclaves equipped with stirring equipment, for example in autoclaves equipped with magnetically-operated stirring devices. Likewise, stirred autoclaves can be employed even for continuous operations. A type of reactor which may be employed is that described in U. S. 2,493,917. In another method of operation, catalyst, ethylene and liquid hydrocarbon reaction medium can be passed concurrently through a reaction tube or coil, thence to a separator.

In carrying out the polymerization of ethylene in contact with the catalysts of the present invention and liquid aromatic hydrocarbon reaction media, the polymers which dissolved in the reaction medium were usually characterized as being of substantially lower specific viscosity than the polymers which were retained upon and within the catalyst. Also, successive extraction of the catalyst containing polymers removed polymer fractions of successively increasing specific viscosity.

It is desirable to remove occluded solid resinous conversion products from the catalyst and to reactivate the catalyst when about 10 to about 300 grams of said resinous conversion products have accumulated per 100 grams of catalyst. Substantial reduction in activity of the catalyst is apparently not due only to the accumulation of solid resinous ethylene conversion products thereon, since extraction of said resinous products from the catalyst is in itself not enough to fully restore catalyst activity. Catalyst containing 10 to 30 grams of resinous products per 100 grams of catalyst may be regenerated by a treatment of the type employed initially to activate the fresh catalyst, preferably following extraction of polymer and/or resinous materials from the partially spent catalyst.

The regeneration of partially spent catalyst by treatment with hydrogen or other reducing agents can be effected under the same conditions employed for initial activation of a batch of fresh catalyst, but in some instances milder conditions, i. e., lower temperatures and pressures, may be employed.

In order to extract the high molecular weight ethylene polymers which tend to be tenaciously retained within the pores of the catalyst, it is important to conduct the extraction operation at a minimum temperature which lies between about the softening points and melting points of the polymers, usually temperatures within the range of about 80° C. to about 150° C., and which may extend to considerably higher temperatures, e. g., up to about 325° C. When a relatively low boiling solvent such as benzene is employed it will be necessary to conduct the extraction or catalyst cleansing under sufficient pressure to maintain the solvent substantially in the liquid phase at the desired extraction temperature.

The solute can be recovered from the solvent by conventional methods, for example by cooling, by evaporation of the solvent from the solute or by dilution of the solution with antisolvents, such as acetone, methyl ethyl ketone, methyl isobutyl ketone, etc. A suitable method of operation involves cooling the hot solution to effect precipitation of one or more fractions of solute, the highest specific viscosity fractions of the solute being the first precipitates, and separating one or more precipitates from the remaining solution by filtration. Sometimes the operation of the present process leads to the production of more or less grease-like low molecular weight polymers having the consistency of petrolatum or soft grease and characterized by an approximate molecular weight range of 300 to 700; the grease-like products are characterized by their solubility in aromatic hydrocarbon solvents such as xylenes even at room temperature. The grease-like ethylene polymers (which may contain aromatic groups introduced by alkylation) can be separated from the xylene solvent by evaporation of the latter, preferably after separating high molecular weight polymers by cooling and filtration, as described above.

In the table are presented data obtained in illustrative batch polymerization tests. The reactor employed was a rocking bomb or autoclave having 183 ml. capacity. In each instance, except as otherwise noted, the reactor was charged with catalyst pellets (⅜ inch diameter and length) and the catalyst was conditioned or activated. All the molybdena-zirconia catalysts, except where noted, were prepared by the same general procedure. The hydroxide of the group 4a metal was precipitated by neutralizing the solution of a salt with ammonium hydroxide to a pH of 8.0. The precipitate was washed thoroughly with distilled water, and finally made into a thick slurry with distilled water. A solution of ammonium-molybdate (proper quantity) was added to the thick slurry and this mixture was dried at 150° C. and was calcined at about 540 to 595° C. for 1 hour. This procedure makes catalysts which appear to be homogeneous except in the cases where the molybdena content is 50%.

The conditioning or activation was in the reactor with hydrogen gas at about 455° C., 150–200 p. s. i. g. and 1 hour, except in run 10, in which 15 seconds was used. The conditioning process apparently reduced $MoO_3$ in the catalyst in substantial measure to a lower molybdenum oxide. The reactor was then charged with 100 ml. of liquid reaction medium and pressured with commercial cylinder ethylene to about 1100 p. s. i. g. at room temperature. The polymerization was, in each instance, effected over a period of about 2 hours at the temperatures indicated. Ethylene was pressured into the reactor intermittently to maintain ethylene pressure. Upon completion of a polymerization test, the reactor was allowed to cool to room temperature, then depressured to atmospheric pressure, opened and the catalyst-liquid reaction medium mixed with additional solvent and subjected to extraction at the normal boiling point of the solvent. After the extraction operation, the clear solution was decanted from the catalyst.

A substantial proportion of the polyethylene, especially the polymers of high molecular weight, are more or less tenaciously retained upon and within the catalysts. Extraction of the catalysts with a suitable solvent, usually boiling commercial xylenes, removes some of the polymer, which separates from solution on cooling. The "grease" product of the table is a relatively low molecular weight polyethylene (about 300–700 molecular weight by the Menzies-Wright method) obtained by evaporating the xylene solvent after filtering the high molecular weight polyethylenes which separate from the solvent at temperatures below the boiling point. The "grease" is readily soluble in xylenes and other aromatic solvents at room temperature.

The specific viscosity $(N_{sp}) \times 10^5$ of the high molecular weight polyethylenes was determined by measurements performed upon solutions containing 0.125 gram of polyethylene per 100 ml. xylene at a temperature of 110° C.

Important variations from test to test are discussed in the textual treatment of the data following the table herein.

Table

| Run No. | Catalyst | Wt. of Catalyst, g. | Liquid Reaction Medium | Polym. Temp., °C. | Polyethylene | | Grease, g. |
|---|---|---|---|---|---|---|---|
| | | | | | g. | $N_{sp} \times 10^5$ | |
| 1 | 4% molybdena-zirconia | 15 | Xylene | 232 | 6.7 | | 0.2 |
| 2 | 8% molybdena-zirconia | 15 | ...do | 232 | 9.4 | 110,000 | 3.6 |
| 3 | 20% molybdena-zirconia | 15 | ...do | 232 | 10.0 | Insol | 2.5 |
| 4 | 50% $MoO_3$ on $ZrO_2$ | 15 | ...do | 232 | 3.6 | 60,100 | 0.2 |
| 5 | 8% molybdena-titania | 15 | ...do | 232 | 7.1 | 43,000 | 0.2 |
| 6 | 20% molybdena-titania | 15 | ...do | 232 | 5.2 | | 0.2 |
| 7 | Ni molybdate-$ZrO_2$ | 15 | ...do | 232 | 5.0 | 104,000 | 0.2 |
| 8 | Fe molybdate-$ZrO_2$ | 15 | ...do | 232 | 5.7 | 66,500 | 0.1 |
| 9 | Co molybdate-$ZrO_2$ | 15 | ...do | 232 | 5.3 | 163,000 | 0.2 |
| 10 | Aluminum molybdate-$ZrO_2$ | 15 | ...do | 232 | 6.1 | | |
| 11 | 8% $MoO_3$-8% $ZrO_2$-$Al_2O_3$ | 15 | Benzene | 122 and 232 | 7.4 | Insol | 0.2 |

The tabulated data show that the condition molybdena-zirconia and molybdena-titania catalysts are active for the polymerization of ethylene to produce normally solid polymers and grease-like products. The zirconia-based catalysts usually gave somewhat larger yields of normally solid polymerization products than the titania-based catalysts.

The controlled variable in runs 1 to 4, inclusive, was the concentration of molybdenum in the catalysts. It will be noted that conditioned catalysts containing 4 to 50% by weight of $MoO_3$ (before conditioning) on $ZrO_2$ were active for the desired purposes. In this series of runs, the highest yield of solid ethylene polymer was obtained by the use of the 20% molybdena-zirconia catalyst. It will further be noted that ethylene polymers of extremely high specific viscosity were produced; the polymer in run 3 was of such high specific viscosity or molecular weight that it could not be dissolved appreciably in boiling xylene.

In runs 5 and 6, substantial yields of normally solid ethylene polymers were obtained by the use of molybdena-titania catalysts.

We have also performed studies on more complex catalysts than those described above, as shown in runs 7 to 10, inclusive. After calcination but before the conditioning treatment with hydrogen, the catalyst employed in run 7 contained 2.6 weight percent NiO, 7.4 weight percent $MoO_3$ and 90.0 weight percent $ZrO_2$; the catalyst employed in run 8 contained 4.2 weight percent $Fe_2O_3$, 7.2 weight percent $MoO_3$ and 88.6 weight percent $ZrO_2$; the catalyst employed in run 9 contained 2.7 weight percent CoO, 7.2 weight percent $MoO_3$ and 90.1 weight percent $ZrO_2$; the catalyst employed in run 10 contained 1.2 weight percent $Al_2O_3$, 8.3 weight percent $MoO_3$ and 90.5 weight percent $ZrO_2$. The high specific viscosities of the polymers produced by the use of the multicomponent catalysts is noteworthy. In run 11, a good yield of high specific viscosity ethylene polymer was produced by the employment of a molybdena-zirconia-gamma alumina catalyst.

In addition to the information tabulated above, the following information serves further to characterize our invention. Molybdic acid powder failed to catalyze solid polyethylenes production at 230° C. and 1000 p. s. i. g. ethylene pressure. It was also found that the employment of a hydrogen-reduced 8% molybdena-activated coconut charcoal catalyst failed to induce ethylene polymerization under the standardized conditions employed in other batch runs. The employment of a commercial $MoS_2$-ZnO-MgO hydrogenation catalyst at 127° C. and 1000 p. s. i. g. ethylene pressure yielded no solid ethylene polymer although a sulfur-containing hydroforming catalyst was active. A commercial $MoS_2$-gamma $Al_2O_3$ catalyst was found to be inactive for the preparation of polyethylene when tested under standardized conditions in a batch reactor. The employment of a hydrogen-activated 7% molbdena-silica gel catalyst produced only a trace of solid product from ethylene under the standardized conditions employed in other batch runs.

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to even a wider extent than polyethylenes made by prior processes.

The polymers produced by the process of the present invention can be blended with the conventional lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and 1 per cent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a specific viscosity of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about ten liters of xylenes at a temperature close to the boiling point produced an extremely viscous solution.

The polymers produced by the present process can be subjected to chemical modifying treatments, such as halogenation, halogenation followed by dehalogenation, sulfonation, and other reactions to which hydrocarbons may be subjected.

Having thus described our invention what we claim is:

1. A process for producing a solid polymer which comprises contacting ethylene with an activated catalyst at a suitable polymerization temperature between about 75° C. and about 325° C. and recovering a solid polymer thus produced, said catalyst, before activation, comprising essentially at least one weight percent each of a hexavalent molybdenum-oxygen compound and a group 4a metal oxide selected from the class consisting of titania and zirconia, activation of said catalyst before use thereof in polymerization being effected by partially reducing said hexavalent molybdenum-oxygen compound when present on said group 4a metal oxide by treatment with a reducing gas at a temperature of at least about 300° C. and for a period of time sufficient to effect substantial activation of said catalyst.

2. The process of claim 1 wherein said hexavalent molybdenum-oxygen compound is molybdenum trioxide.

3. The process of claim 2 wherein said catalyst, before activation, comprises between about 4 and about 50 percent by weight of molybdenum trioxide.

4. The process of claim 1 wherein said hexavalent molybdenum-oxygen compound is cobalt molybdate.

5. The process of claim 1 wherein said hexavalent molybdenum-oxygen compound is iron molybdate.

6. The process of claim 1 wherein said hexavalent molybdenum-oxygen compound is nickel molybdate.

7. The process of claim 1 wherein said hexavalent molybdenum-oxygen compound is aluminum molybdate.

8. The process of claim 1 wherein ethylene is employed in admixture with propylene.

9. The process of claim 1 wherein said reducing gas is selected from the group consisting of hydrogen, carbon monoxide, mixtures of hydrogen and carbon monoxide, and sulfur dioxide.

10. A process for producing a solid polymer which comprises contacting ethylene in the presence of a liquid hydrocarbon reaction medium with an activated catalyst at a suitable polymerization temperature between about 75° C. and about 325° C. and recovering a solid polymer thus produced, said catalyst, before activation, comprising essentially at least one weight percent each of a hexavalent molybdenum-oxygen compound and a group 4a metal oxide selected from the class consisting of titania and zirconia, activation of said catalyst before use thereof in polymerization being effected by partially reducing said hexavalent molybdenum-oxygen compound when present on said group 4a metal oxide by treatment with a reducing gas at a temperature of at least about 300° C. and for a period of time sufficient to effect substantial activation of said catalyst.

11. The process of claim 10 wherein said reaction medium comprises essentially a liquid aromatic hydrocarbon.

12. The process of claim 10 wherein said reaction medium comprises essentially a liquid saturated hydrocarbon.

13. A process for producing a solid polymer which comprises contacting ethylene in the presence of a liquid hydrocarbon reaction medium with an activated catalyst at a polymerization temperature between about 130° C. and about 260° C. under an ethylene pressure of at least about 200 p. s. i. and recovering a solid polymer thus produced, said catalyst, before activation, comprising essentially a minor proportion of molybdenum trioxide supported upon a major proportion of a group 4a metal oxide selected from the class consisting of titania and zirconia, activation of said catalyst before use thereof in polymerization being effected by partially reducing said molybdenum trioxide when present on said group 4a metal oxide by treatment with hydrogen at a temperature between about 300° C. and about 650° C. for a period of time sufficient to effect substantial activation of said catalyst.

14. The process of claim 13 wherein said contacting is effected at a temperature between about 200° C. and about 250° C.

15. The process of claim 13 wherein said liquid hydrocarbon reaction medium comprises essentially benzene.

16. The process of claim 13 wherein said liquid hydrocarbon reaction medium comprises essentially xylenes fraction.

17. The process of claim 13 wherein ethylene is employed in admixture with propylene.

18. The method of producing a solid polymer which comprises absorbing ethylene under superatmospheric pressure in a liquid aromatic hydrocarbon reaction medium to produce a solution containing between about 2 and about 10 percent by weight of ethylene, contacting said solution at a polymerization temperature between about 130° C. and about 260° C. with an activated catalyst comprising essentially a minor proportion of molybdenum trioxide supported upon a major proportion of a group 4a metal oxide selected from the class consisting of titania and zirconia, activation of said catalyst before use thereof in polymerization being effected by partially reducing said molybdenum trioxide when present on said group 4a metal oxide by treatment with hydrogen at a temperature between about 300° C. and about 650° C., thereafter removing said liquid aromatic hydrocarbon reaction medium containing dissolved solid polymer from contact with said catalyst, and separating said polymer from said liquid aromatic hydrocarbon reaction medium.

19. The process of claim 18 wherein said liquid aromatic hydrocarbon reaction medium comprises essentially benzene.

20. The process of claim 18 wherein said liquid aromatic hydrocarbon reaction medium comprises essentially a xylenes fraction.

21. The process of claim 18 wherein said liquid aromatic hydrocarbon reaction medium comprises essentially toluene.

22. The process of claim 1 wherein said catalyst, before activation, consists essentially of between about 4 and about 50 percent by weight of said hexavalent molybdenum-oxygen compound and, the remainder, a supporting material which is a group 4a metal oxide selected from the class consisting of titania and zirconia.

References Cited in the file of this patent

UNITED STATES PATENTS

| Number | Name | Date |
|---|---|---|
| 2,153,553 | Fawcett | Apr. 11, 1939 |
| 2,259,961 | Myddleton | Oct. 21, 1941 |
| 2,393,288 | Byrns | Jan. 22, 1946 |
| 2,487,564 | Layng | Nov. 8, 1949 |
| 2,572,300 | Arnold et al. | Oct. 23, 1951 |